United States Patent [19]

Fujiwara et al.

[11] Patent Number: 4,468,703

[45] Date of Patent: Aug. 28, 1984

[54] IMAGE SIGNAL PROCESSING DEVICE

[75] Inventors: Fukumi Fujiwara; Yoshio Arai, both of Kanagawa, Japan

[73] Assignee: Fuji Xerox Co., Ltd., Tokyo, Japan

[21] Appl. No.: 378,353

[22] Filed: May 14, 1982

[30] Foreign Application Priority Data

May 15, 1981 [JP] Japan .................................. 56-72281

[51] Int. Cl.³ .......................... H04N 1/40; G06K 9/38
[52] U.S. Cl. ....................................... 358/282; 382/51
[58] Field of Search .................... 358/282; 382/51, 52, 382/53

[56] References Cited

U.S. PATENT DOCUMENTS

| 3,502,993 | 3/1970 | Schürzinger et al. | 382/53 |
| 4,247,873 | 1/1981 | Decuyper | 382/53 |
| 4,272,789 | 6/1981 | Biron | 358/283 |

Primary Examiner—John C. Martin
Assistant Examiner—John K. Peng
Attorney, Agent, or Firm—Sughrue, Mion, Zinn, Macpeak and Seas

[57] ABSTRACT

An image signal processing device uses an automatically varied threshold value calculated from the average density and the density distribution of an original (document, etc). The threshold value is periodically updated at predetermined intervals, so that the overall image may be reproduced with high fidelity.

4 Claims, 5 Drawing Figures

IMAGE SIGNAL PROCESSING DEVICE

BACKGROUND OF THE INVENTION

This invention relates to image signal processing devices, and more particularly to an image signal processing device in which the data of an original such as a document or a picture are optically read and converted into electrical signals, which are binary-coded with reference to a threshold value.

Heretofore, in binary-coding the electrical signals obtained by optically reading the data on originals such as documents and/or pictures into white and black level signals, a binary coding system has generally been employed in which a fixed threshold value is provided; the electrical signals being compared with the threshold value.

FIG. 1 shows the relationships between such signals and the threshold value of the binary coding system. In FIG. 1, reference character A designates a white level; B, a black level; and C, a fixed threshold value.

The system is effective for a signal (a) read from a clear original which is low in background density. However, the system is still disadvantageous in that, for a signal (b) read from an original which is high in background density or a signal (c) read from an original where the document and/or picture is low in density, it is impossible to reproduce the image with high fidelity.

A system is also known in the art in which the threshold value may be varied for binary-coding the electrical signals. However, this system is also disadvanageous in that, since the threshold value must be manually indicated, the operation is considerably intricate.

SUMMARY OF THE INVENTION

Accordingly, an object of this invention is to provide an image signal processing device in which the above-described difficulties accompanying the prior art have been eliminated, and in which the threshold value is automatically controlled according to the background density or image density of the original, whereby the image is reproduced with high fidelity.

The foregoing object of the invention has been achieved by the provision of an image signal processing device in which, according to the invention, a threshold value is periodically set at predetermined intervals of time according to the average density and density distribution of an original, and is varied automatically.

DETAILED DESCRIPTION OF THE PREFERRED EMBODIMENTS

Figure 1:
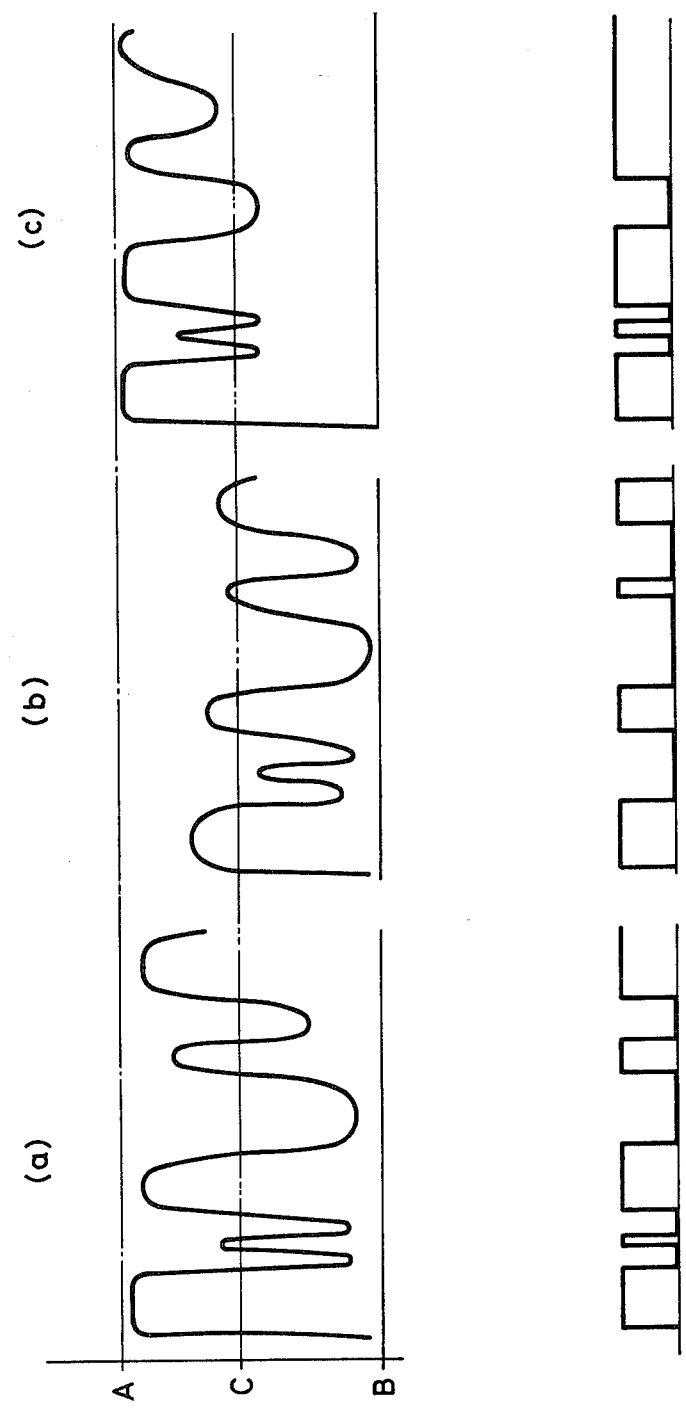
FIG. 1 is a waveform diagram showing image signals in a conventional case in which a fixed threshold value is employed.
Figure 2:
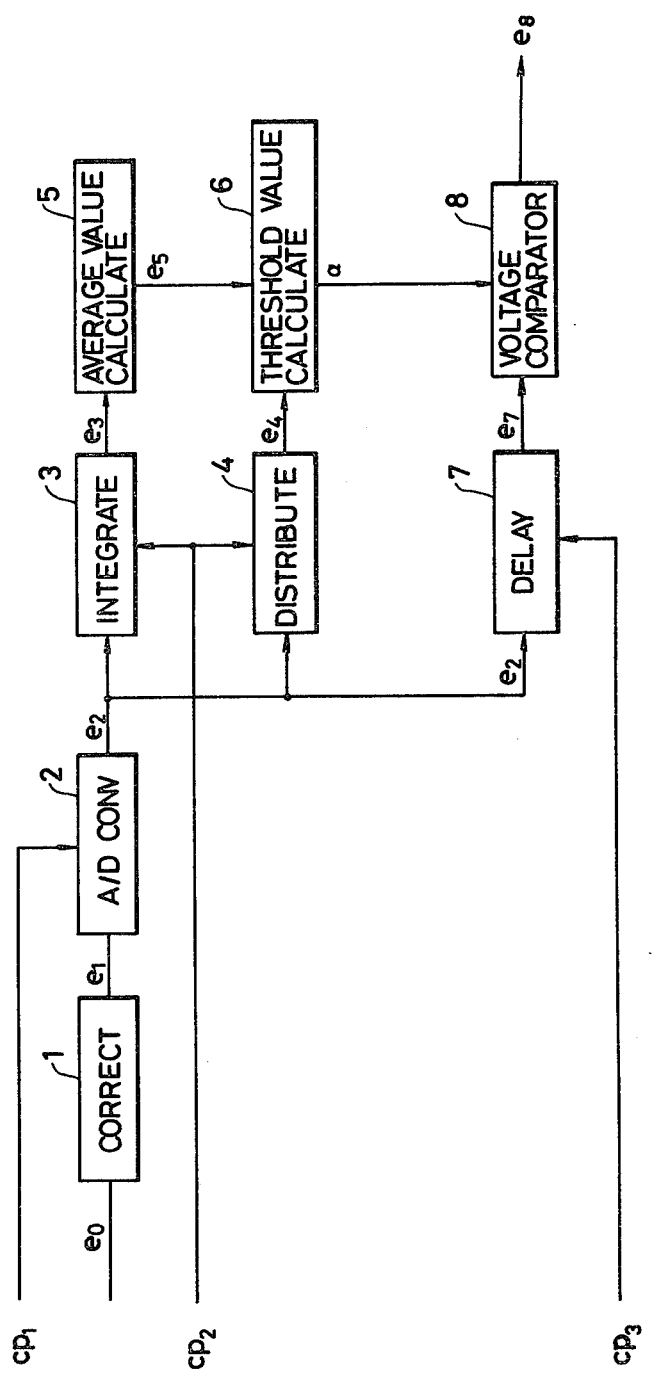
FIG. 2 is a block diagram showing one embodiment of this invention.

One embodiment of this invention will now be described with reference to FIGS. 2 through 3. FIG. 2 is a block diagram showing one embodiment of the invention.

In FIG. 2, reference numeral 1 designates a correcting circuit for correcting any non-uniformity in illuminance of an image signal e0 outputted by a one-dimensional image sensor (not shown) which is due to the characteristics of the image sensor; and 2 is an A/D converter for converting a output signal e1 of the correcting circuit 1 into a digital signal e2 having multiple levels.

Further in FIG. 2, reference numeral 3 designates an integration circuit which receives the digital signal e2 and outputs an integration value e3; and 4 is a distribution circuit which receives the digital signal e2 and outputs a density frequency distribution e4. The lines CP1, CP2 and CP3 carry appropriate clock pulses.

Reference numeral 5 designates an average value calculating circuit for obtaining an average density value e5 from the integration value e3 outputted by the integration circuit 3; and 6 is a threshold value calculating circuit for calculating a threshold value $\alpha$ from the density frequency distribution e4 outputted by the distribution circuit 4 and the average density value e5 provided from the average value calculating circuit 5.

Further in FIG. 2, reference numeral 7 designates a delay circuit for delaying the digital signal e2 for a predetermined period of time; and 8 is a voltage comparator in which the delayed digital signal e7 outputted by the delay circuit 7 is compared with the aforementioned threshold value $\alpha$, to output a binary-coded image signal e8.

Figure 3:
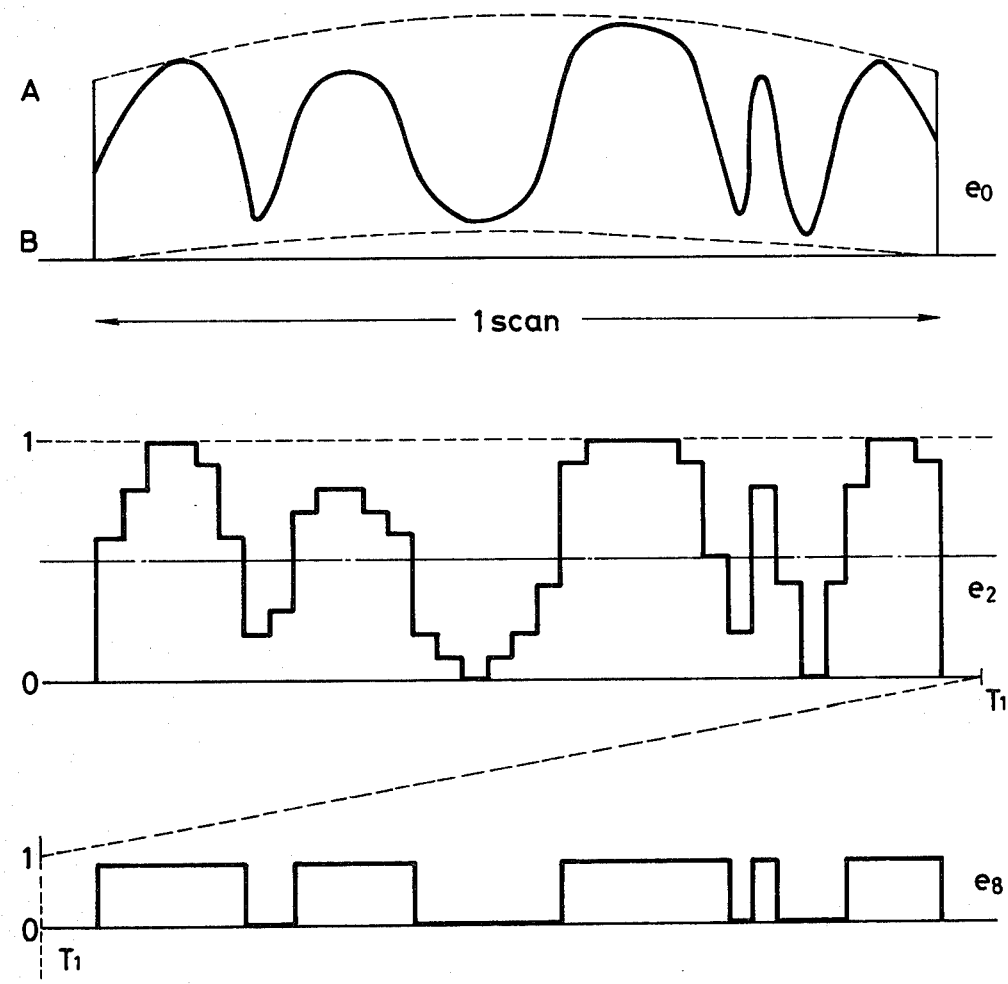
FIG. 3 is a waveform diagram showing the signals at the essential circuit elements of FIG. 2.
Figure 4:
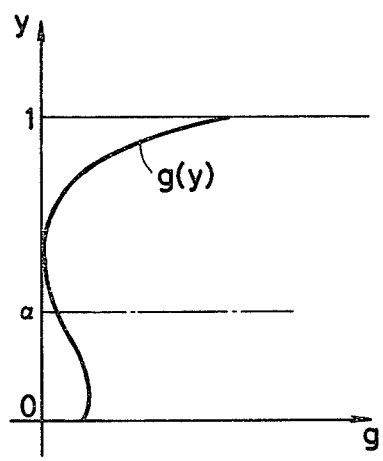
FIGS. 4 and 5 are explanatory diagrams for describing the operation of the threshold value calculating circuit of FIG. 2.
Figure 5:
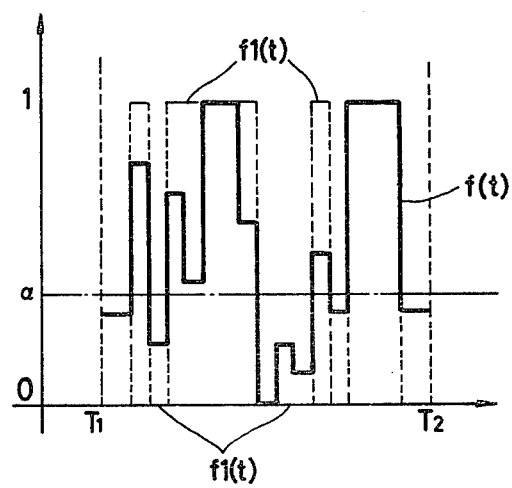

FIG. 3 is a waveform diagram showing the signals at the essential circuit elements of FIG. 2. FIGS. 4 and 5 are explanatory diagrams for describing the operation of the threshold value calculating circuit 6 in FIG. 2. The operation of the device will be described with reference to FIGS. 2 through 5. In FIG. 3, reference character A designates a white level; and B, a black level. In FIG. 4, the vertical axis y expresses the density values of the image signals, and the horizontal axis g expresses the frequencies of the density values y. Further in FIG. 4, reference character g(y) designates the frequency distribution; and $\alpha$, a threshold value.

In FIG. 5, the horizontal axis is the time axis, and the vertical axis represents the amplitudes of the image signals. Further in FIG. 5, reference character f(t) designates the digital signal and f1(t) denotes a signal obtained by binary-coding the aforementioned digital signal f(t) (where $T1 \leq t \leq T2$); and $\alpha$ indicates a threshold value.

The optical system reads an original such as a document and/or a picture to provide an image signal (or an analog signal) e0. The image signal e0 is applied to the corresponding circuit 1, where any non-uniformity in optical quantity of the image signal e0 due to a non-uniformity in illuminance of the optical system is corrected. More specifically, the white and black levels of the read analog signal are corrected.

The image signal e1 corrected by the correcting circuit 1 is applied to the A/D converter 2, where it is converted into the digital signal e2 having multiple levels (FIG. 3, center). The digital signal e2 is applied to the integration circuit 3, the distribution circuit 4 and the delay circuit 7.

The digital signal e2 applied to the integration circuit 3 is subjected to integration for a predetermined period of time (between the time instants T1 and T2 in FIG. 5), as a result of which an integration value e3 is outputted.

The density frequency distribution g(y) (FIG. 4) between the time instants T1 and T2 is obtained from the digital signal e2 applied to the distribution circuit 4; that is, the density frequency distribution e4 is outputted.

The integration value e3 from the integration circuit 3 is applied to the average value calculating circuit 5, where the average density value e5 for the predetermined period of time is calculated according to the following expression (1):

$$\frac{\int_{T1}^{T2} f(t)dt}{T2 - T1} \quad (1)$$

The density frequency distribution e4 provided by the distribution circuit 4 and the density average value e5 provided by the average value calculating circuit 5 are applied to the threshold circuit 6, to calculate a threshold value $\alpha$.

The method of calculating the aforementioned threshold value $\alpha$ will now be described.

In the invention, a value which satisfies the following equation (2) is obtained, where the digital signal e2 is represented by f(t) (where T1<t<T2) and the frequency distribution of the values y of f(t) is represented by g(y), and the value thus obtained is employed as the threshold value $\alpha$.

$$\frac{\int_{\alpha}^{1} g(y)dy}{\int_{0}^{1} g(y)dy} = \frac{\int_{T1}^{T2} f(t)dt}{T2 - T1} \quad (2)$$

The threshold value $\alpha$ thus calculated is output from the threshold value calculating circuit 6 to the voltage comparator 8. The delay circuit 7 outputs the delayed digital signal e7 with a predetermined delay time to the voltage comparator.

In the voltage comparator 8, the delayed digital signal e7 is compared with the threshold value $\alpha$, to output the binary-coded image signal e8; that is, f1(t).

In the invention, the threshold value is determined as described above. Therefore, if the digital signal is represented by f(t), then when f(t)≧$\alpha$, f1(t)=1, and when f(t)<$\alpha$, f1(t)=0

In this case the following equation (3) holds:

$$\int_{T1}^{T2} f1(t)dt = \int_{T1}^{T2} f(t)dt \quad (3)$$

That is, in FIG. 5, the area defined by f(t) and the horizontal axis is equal to the area defined by f1(t) and the horizontal axis. In order words, the integration value of the black data of the original is equal to the integration value of the black data of the reproduced image. Thus, the image can be reproduced with higher fidelity according to the invention.

Now, the derivation of equation (3) will be given.

Setting T=T2−T1, the following equation (3A) holds because g(y) is the frequency distribution of the values of f(t):

$$\frac{\int_{\alpha}^{1} g(y)dy}{\int_{0}^{1} g(y)dy} = \frac{\int_{\alpha}^{\leq f(t) \leq 1^{dt}}}{\int_{0}^{\leq f(t) \leq 1^{dt}}} \quad (3A)$$

where

T1≦t≦T2, and $\beta \leq f(t) \leq \gamma^{dt}$ is the time with $\beta \leq f(t) \leq \gamma$ between the time instants T1 and T2. The value of $0 \leq f(t) \leq 1^{dt} = T$. Therefore, from equation 2, $$\frac{\int_{T1}^{T2} f(t)dt}{T} = \frac{\int_{\alpha}^{\leq f(t) \leq 1^{dt}}}{\int_{0}^{\leq f(t) \leq 1^{dt}}} = \quad (4)$$

$$\frac{\int_{\alpha}^{\leq f(t)} dt}{T} \quad (T1 \leq t \leq T2) \text{ Therefore,}$$

$$\int_{T1}^{T2} f(t)dt = \int_{\alpha}^{\leq f(t)} dt$$

where T1≦t≦T2

On the other hand, from the definition of f1(t), $$\int_{T1}^{T2} f1(t)dt = 0 \cdot \int f(t) < \alpha^{dt} + 1 \cdot \int_{\alpha}^{\leq f(t)} dt \quad (5)$$

(T1 ≦ t ≦ T2)

Therefore, $$\int_{T1}^{T2} f1(t)dt = \int_{\alpha}^{\leq f(t)} dt$$

where T1≦t≦T2.

Accordingly, from equations (4) and (5), $$\int_{T1}^{T2} f1(t)dt = \int_{T1}^{T2} f(t)dt$$

In the above-described embodiment, the digitalized signal is employed as the input signal e2; however, it goes without saying that the analog signal can be used as it is.

As is apparent from the above description, in the invention, according to the average density and density distribution of an original, a threshold value is set as to satisfy the aforementioned equation (3) at predetermined intervals, and the threshold value thus set is automatically varied. Thus, the invention is considerably advantageous in that the threshold value is automatically controlled according to the background and the image density of the original, and the image can thus be reproduced with high fidelity.

What is claimed is:

1. An image signal processing device, comprising: means for determining an average value x of an image signal over a predetermined period of time; means for determining a density distribution g(y) of said image signal over said predetermined period of time; means for calculating a threshold value $\alpha$ from said average value x and said density distribution g(y); and voltage comparator means for comparing said image signal with said threshold value α, to output a binary-coded image signal.

2. A device as claimed in claim 1, said calculating means comprising a threshold value calculation circuit, said threshold value α satisfying:

$$\frac{\int_\alpha^1 g(y)dy}{\int_0^1 g(y)dy} = \bar{x}$$

3. A device as claimed in claims 1 or 2, further comprising means for delaying said image signal, said voltage comparator means operating to binarily encode said delayed image signal.

4. A device as claimed in claims 1 or 2, including integrating circuit means for integrating said image signal over said predetermined period of time, said average value determining means determining said average value from an output of said integrating circuit means.

* * * * *